US011097406B2

(12) United States Patent
Tseng

(10) Patent No.: US 11,097,406 B2
(45) Date of Patent: Aug. 24, 2021

(54) DUST BOOT TOOL

(71) Applicant: Chuan Jiing Enterprise Co., Ltd., Taichung (TW)

(72) Inventor: Tien-Tsai Tseng, Taichung (TW)

(73) Assignee: Chuan Jiing Enterprise Co., Ltd., Taichung (TW)

( * ) Notice: Subject to any disclaimer, the term of this patent is extended or adjusted under 35 U.S.C. 154(b) by 190 days.

(21) Appl. No.: 16/545,539

(22) Filed: Aug. 20, 2019

(65) Prior Publication Data

US 2021/0053197 A1    Feb. 25, 2021

(51) Int. Cl.
*B25B 27/00* (2006.01)
*F16D 3/84* (2006.01)

(52) U.S. Cl.
CPC .......... *B25B 27/0035* (2013.01); *F16D 3/84* (2013.01)

(58) Field of Classification Search
CPC ..... B25B 27/0035; B25B 27/14; B25B 27/28; B25B 27/00–0042; B25B 3/00; B25B 5/00; F16D 3/84; B23P 19/086; B23P 19/08; B60S 5/00; Y10T 29/53657
USPC .......... 29/261, 252, 255, 278, 244; 269/3, 6; 254/93 R
See application file for complete search history.

(56) References Cited

U.S. PATENT DOCUMENTS

2009/0249600 A1* 10/2009 Huang .................. B23P 19/086
29/235

FOREIGN PATENT DOCUMENTS

| EP | 3795291 A1 * | 3/2021 | |
| GB | 2581520 A * | 8/2020 | ......... B25B 27/0028 |
| JP | 2009014124 A * | 1/2009 | ............ B23P 19/086 |
| TW | I330580 B | 9/2010 | |
| TW | I554357 B | 10/2016 | |
| WO | WO-2020188408 A1 * | 9/2020 | .............. A47J 27/09 |

OTHER PUBLICATIONS

STIC Search Report (Year: 2021).*

* cited by examiner

*Primary Examiner* — Monica S Carter
*Assistant Examiner* — Michael A Gump
(74) *Attorney, Agent, or Firm* — Alan D. Kamrath; Karin L. Williams; Mayer & Williams PC

(57) ABSTRACT

A dust boot tool includes a shell, a piston, a valve and stretchable rods. The shell includes a chamber in communication with an inlet channel. Pressurized air enters the chamber via the inlet channel. The piston is movable in the chamber by the pressurized air, and includes a first section, a second section opposite to the first section, a vent in the first section in the vicinity of the inlet channel, and a conical internal face extending on the second section. The valve includes a portion movably inserted in the vent. Each of the stretchable rods includes a stretchable end for contact with a dust boot, an abutment end in contact with the conical internal face of the second section of the piston, and a pivotal portion formed between the stretchable end and the abutment end and pivotally connected to the shell.

15 Claims, 19 Drawing Sheets

DUST BOOT TOOL

BACKGROUND OF INVENTION

1. Field of Invention

The present invention relates to a tool for vehicles and, more particularly, to a tool for dust boots of drive shafts of vehicles.

2. Related Prior Art

An end of a drive shaft of a vehicle is inserted in and hence protected by a dust boot. A specialized tool is needed to locate the dust boot around the end of the drive shaft or remove the dust boot from the end of the drive shaft.

For example, Taiwanese Patent No. I330580 discloses a tool that uses pressurized air to push a piston in a cylinder. The piston pushes and hence causes stretchable rods to expand the dust boot. A user has to depend on his or her own discretion to control the extent to which he or she expands the dust boot with the tool. However, the user could easily over-expand and hence damage the dust boot.

Taiwanese Patent No. I554357 discloses a tool to solve the above-mentioned problems. This tool includes an indicating device located on the piston. When the piston pushes and hence causes the stretchable rods to expand the dust boot to a proper extent, the stretchable rods hit the indicating device to make a sound to remind the user of stopping the pressurized air to keep the stretchable rods expanding the dust boot to the proper extent. However, it is difficult for the user to hear the sound in a noisy environment such as a garage.

The present invention is therefore intended to obviate or at least alleviate the problems encountered in prior art.

SUMMARY OF INVENTION

It is the primary objective of the present invention to provide a dust boot tool that automatically stops expansion when it expands to a proper extent.

To achieve the foregoing objectives, the dust boot tool includes a shell, a piston, a valve and stretchable rods. The shell includes a chamber in communication with an inlet channel. Pressurized air enters the chamber via the inlet channel. The piston is movable in the chamber by the pressurized air, and includes a first section, a second section opposite to the first section, a vent in the first section in the vicinity of the inlet channel, and a conical internal face extending on the second section. The valve includes a portion movably inserted in the vent. Each of the stretchable rods includes a stretchable end for contact with a dust boot, an abutment end in contact with the conical internal face of the second section of the piston, and a pivotal portion formed between the stretchable end and the abutment end and pivotally connected to the shell.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
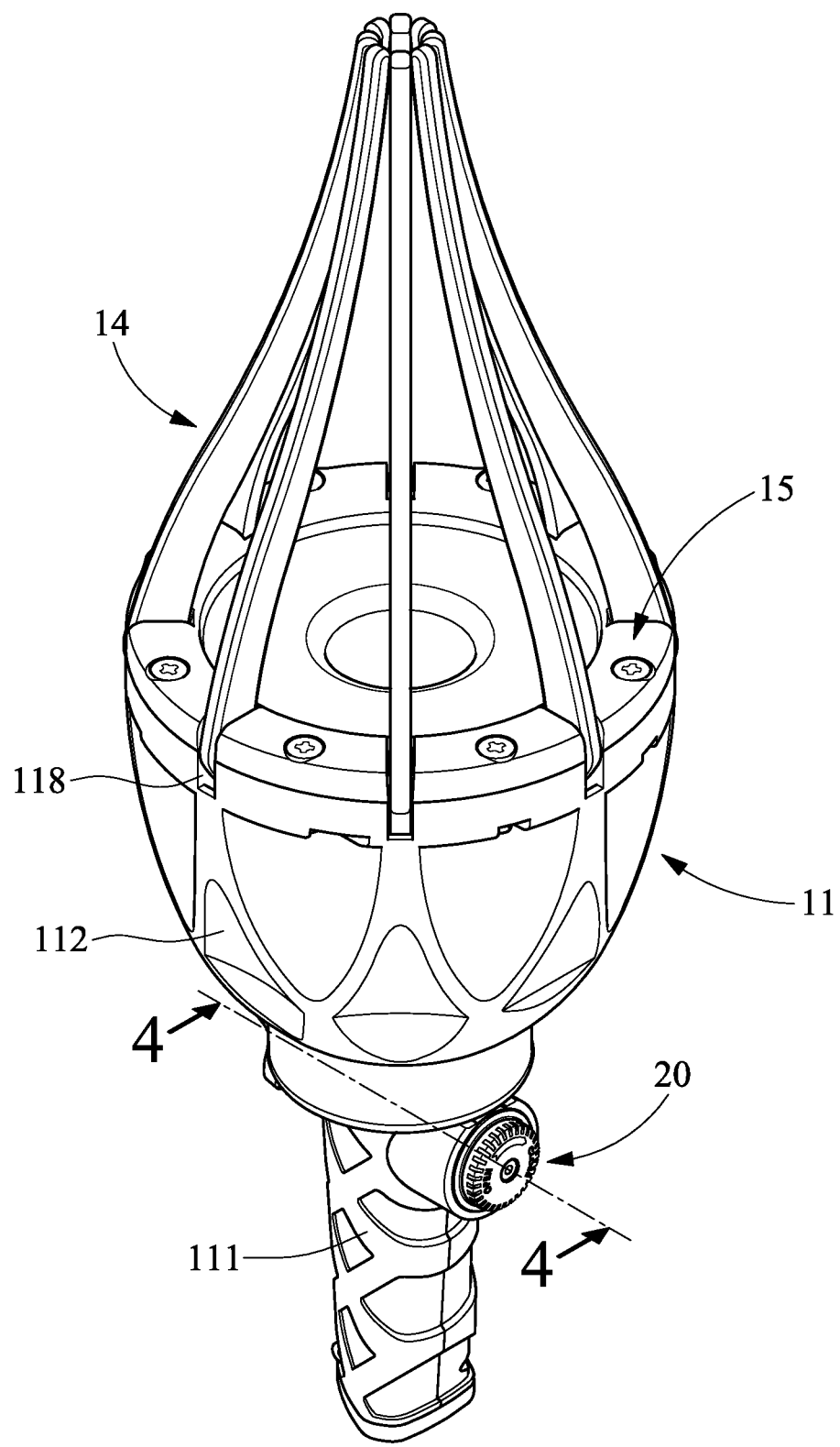
FIG. 1 is a perspective view of a dust boot tool according to the first embodiment of the present invention.
Figure 2:
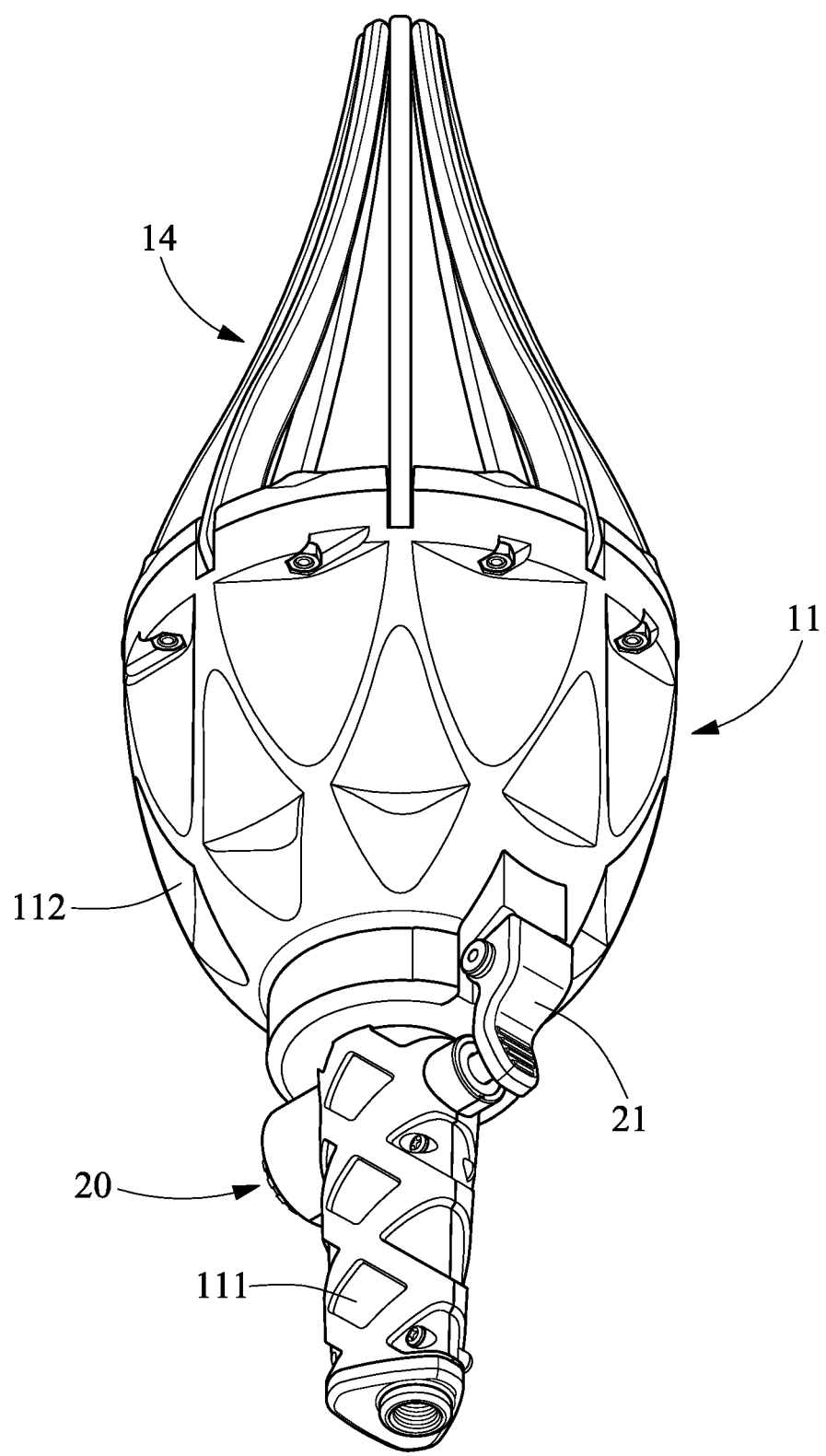
FIG. 2 is another perspective view of the dust boot tool of FIG. 1.

Referring to FIGS. 1 through 4, a dust boot tool includes a shell 11, a seal assembly 12, a piston 13, stretchable rods 14, a cap 15, an elastic element 16 and an air controller 20 according to a first embodiment of the present invention.

Referring to FIGS. 1 to 7, the shell 11 includes a handle 111, a bowl 112, an inlet channel 113, a chamber 114, a regulator channel 115, two regulator apertures 116 and 117, slits 118 and recesses 119.

The handle 111 and the bowl 112 are formed at two opposite ends of the shell 11.

Referring to FIGS. 3 through 6, the inlet channel 113 is made in the handle 111 and the chamber 114 is made in the bowl 112. The inlet channel 113 is in communication with the chamber 114. The inlet channel 113 and the chamber 114 are both in communication with the exterior of the shell 11. The chamber 114 includes a wide section 1142 in the vicinity of a front end and a narrow section 1144 in the vicinity of a rear end. A pump (not shown) can be used to pump pressurized air into the shell 11 via the inlet channel 113.

Figure 4:
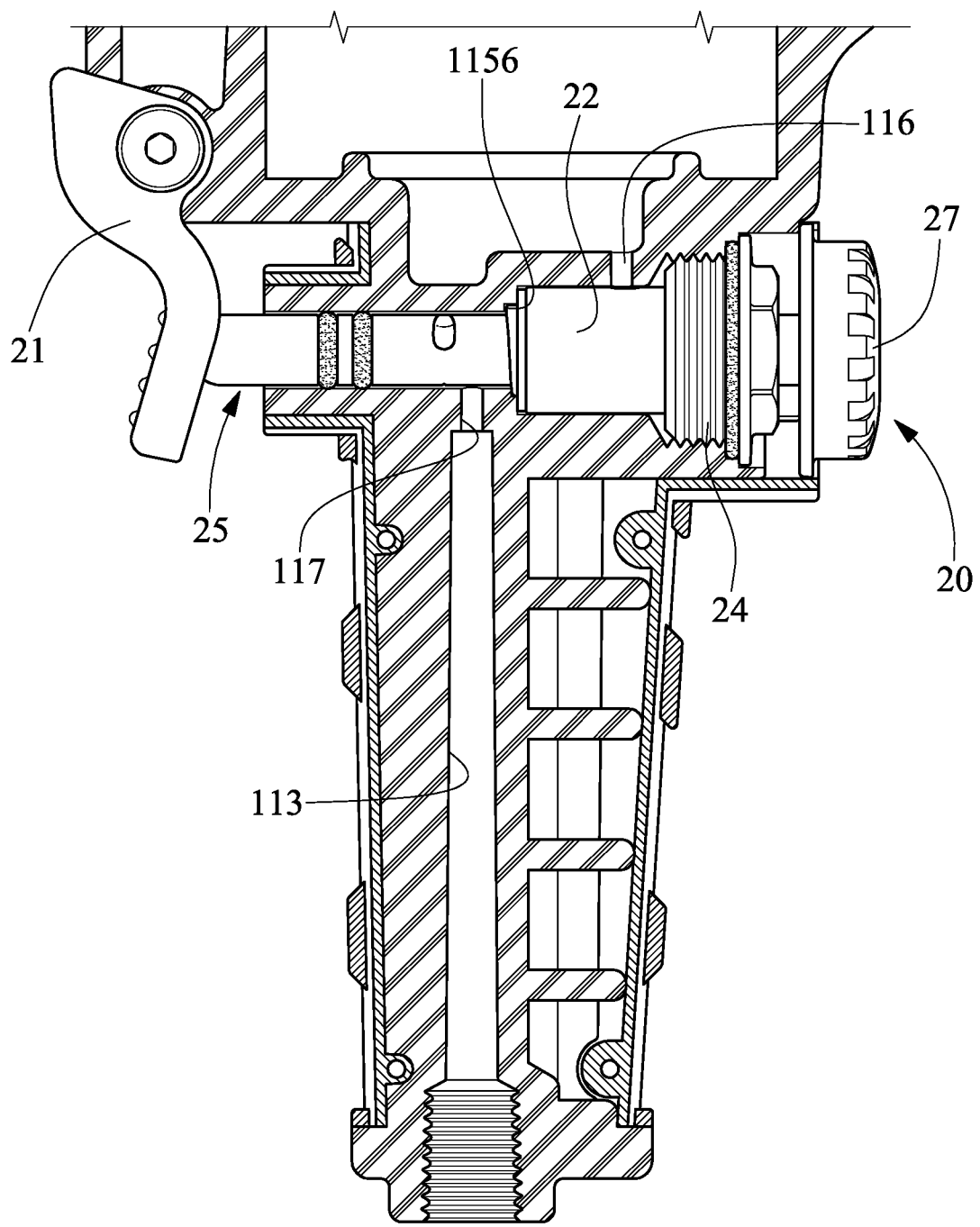
FIG. 4 is a cross-sectional view of another portion of the dust boot tool shown in FIG. 1.
Figure 5:
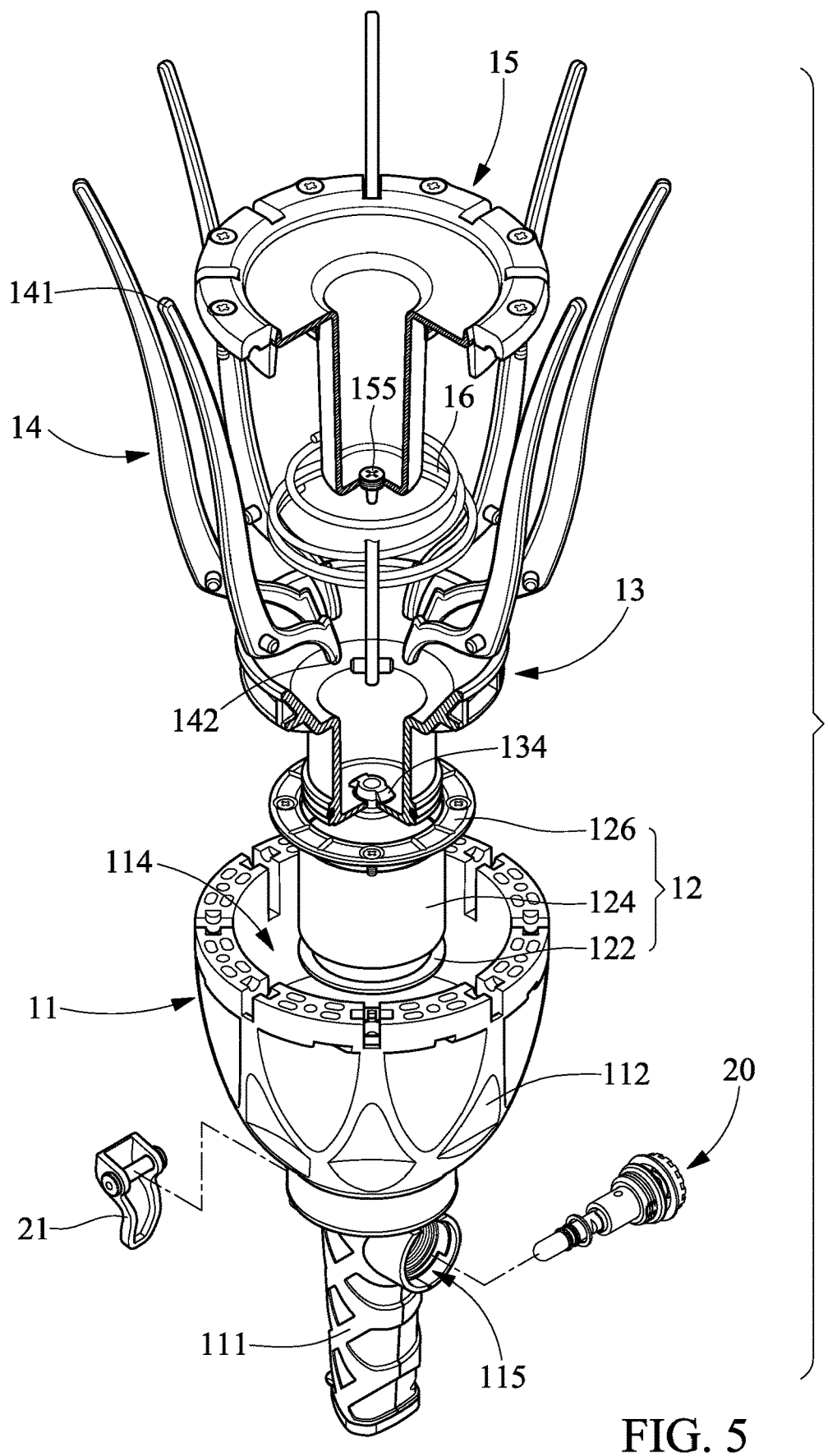
FIG. 5 is an exploded view of the dust boot tool shown in FIG. 1.
Figure 6:
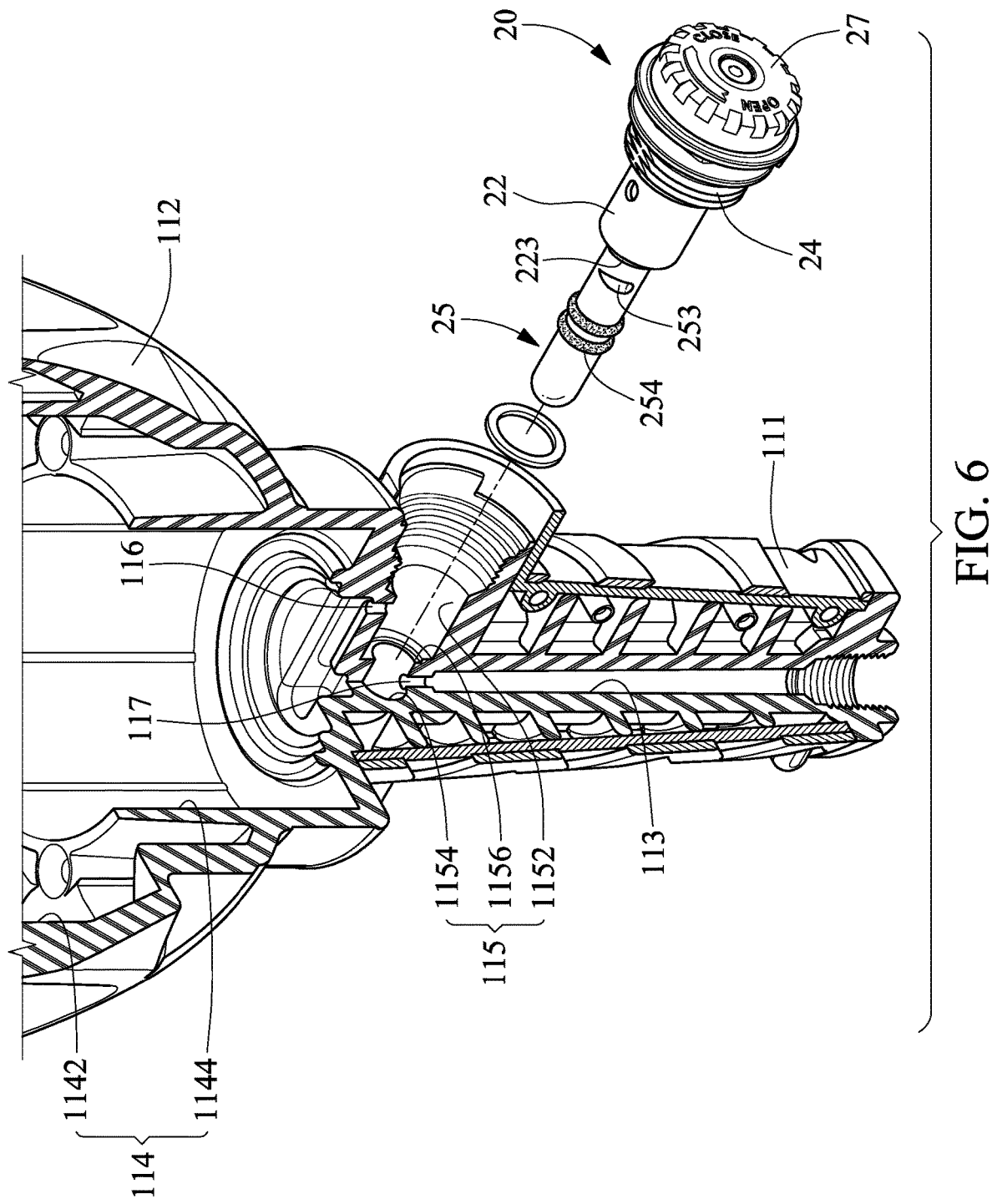
FIG. 6 is an enlarged view of a portion of the dust boot tool shown in FIG. 5.

Referring to FIGS. 4 through 6, the regulator channel 115 is a stepped channel extending throughout the handle 111. The regulator channel 115 includes a wide section 1152, a narrow section 1154 and a transient section 1156 extending to the narrow section 1154 from the wide section 1152. The wide section 1152 is in communication with the chamber 114 via the regulator aperture 116. The narrow section 1154 is in communication with the inlet channel 113 via the regulator aperture 117. However, in another embodiment, the regulator channel 115 and the first and second regulator apertures 116 and 117 can be saved, and the inlet channel 113 can be in communication with the chamber 114 directly.

Figure 7:
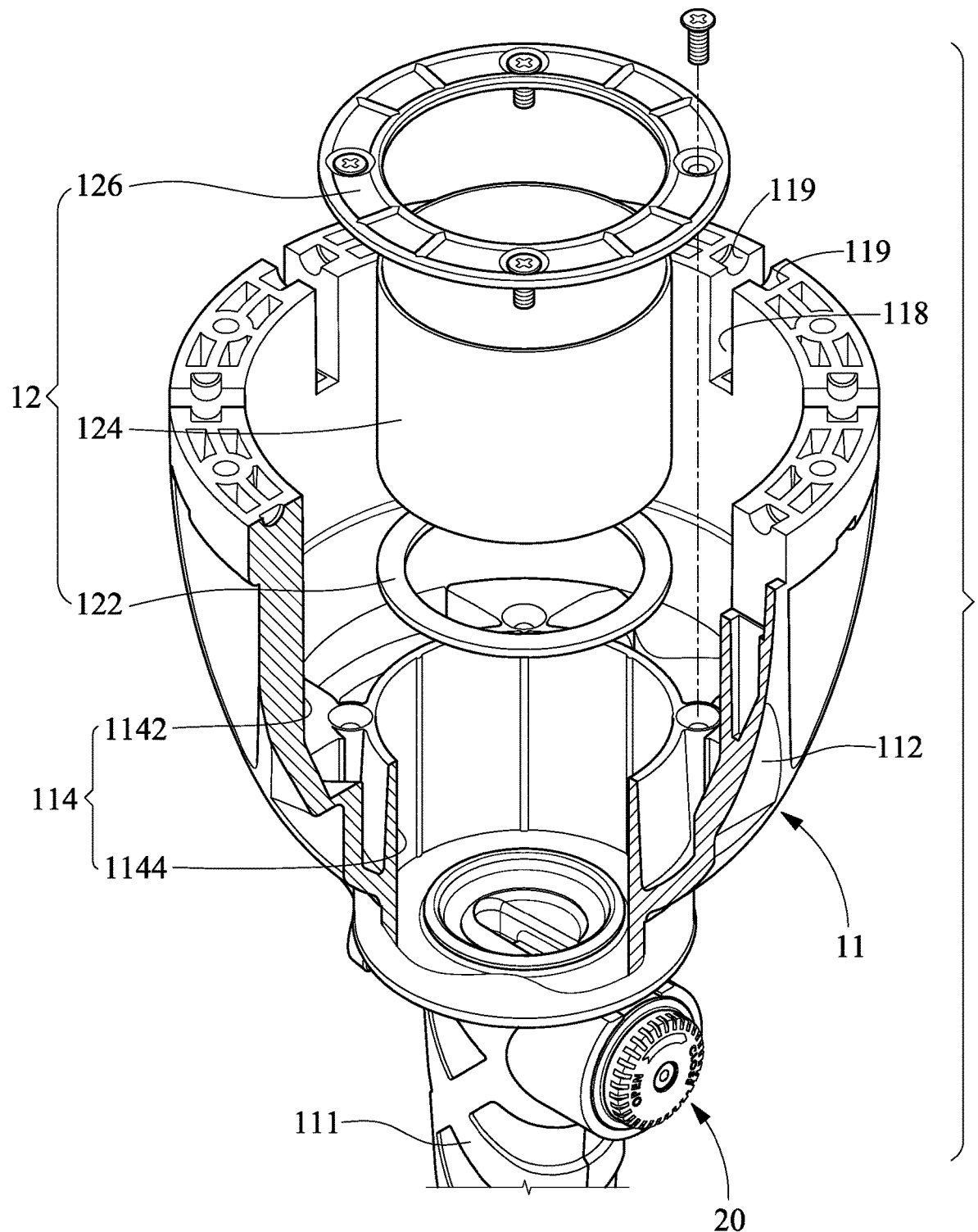
FIG. 7 is an enlarged view of another portion of the dust boot tool shown in FIG. 5.

Referring to FIG. 7, the slits 118 are evenly arranged at a front edge of the bowl 112 that is opposite to the handle 111.

Referring to FIG. 7, the recesses 119 are arranged in pairs at the front edge of the bowl 112. Each of the slits 118 is located between the recesses 119 of a corresponding pair.

Figure 3:
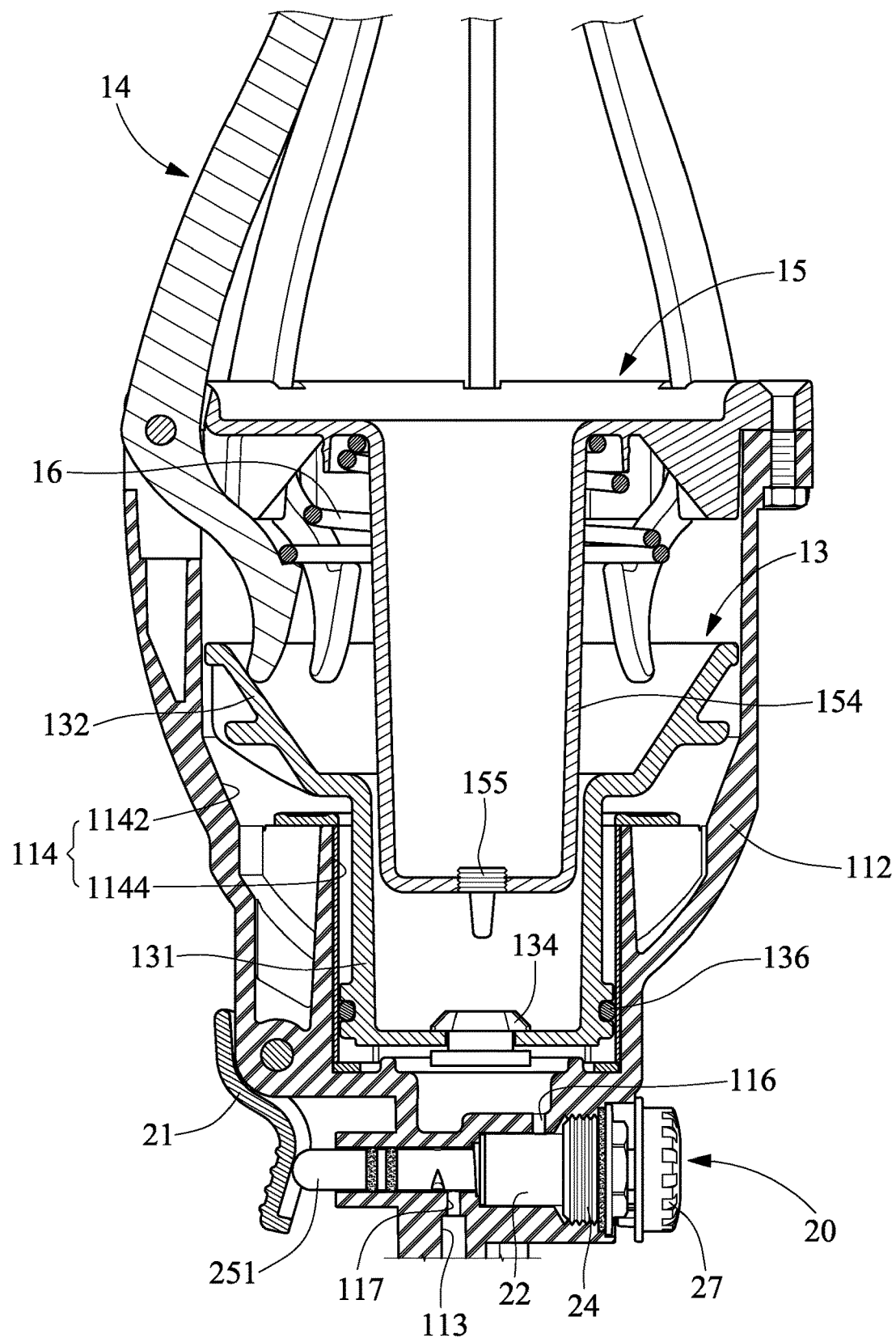
FIG. 3 is a cross-sectional view of a portion of the dust boot tool shown in FIG. 1.

Referring to FIGS. 3, 5 and 7, the seal assembly 12 is inserted in the chamber 114. The seal assembly 12 includes a sealing ring 122, a lining 124 and a retaining ring 126. The sealing ring 122 and the lining 124 are inserted in the narrow section 1144 of the chamber 114. The lining 124 is located on the sealing ring 122. The retaining ring 126 is inserted in the wide section 1142 of the chamber 114 above the lining 124. The retaining ring 126 is connected to the shell 11 by screws (not numbered) for example to keep the sealing 122 and the lining 124 in position.

Figure 8:
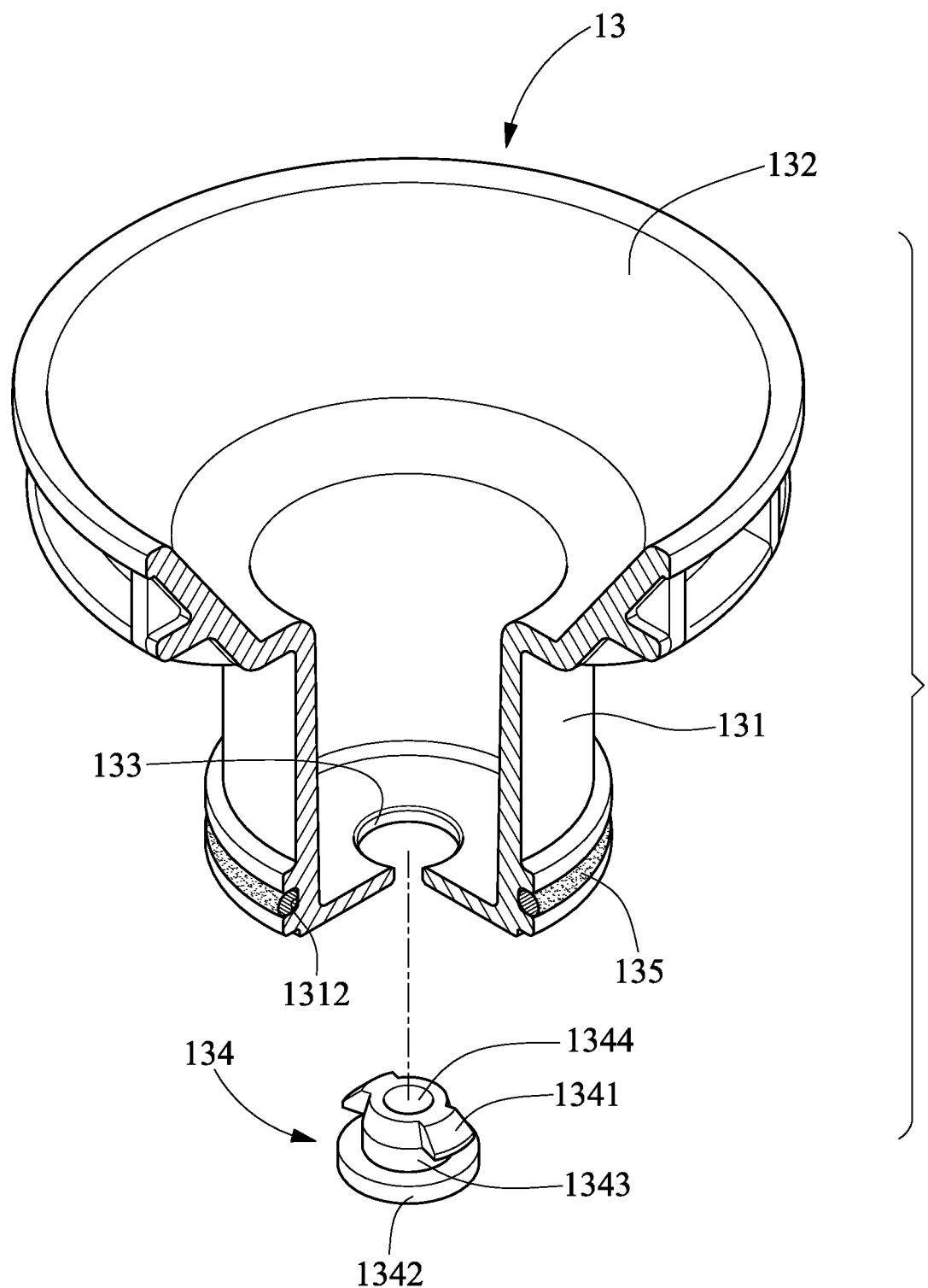
FIG. 8 is an enlarged view of another portion of the dust boot tool shown in FIG. 5.

Referring to FIGS. 3, 5 and 8, the piston 13 is inserted in the chamber 114. The piston 13 is movable relative to the shell 11 by pressurized air. The piston 13 is in the form of a cup with an open front end. The piston 13 includes two sections 131 and 132, a vent 133, a valve 134 and a sealing ring 135.

The sections 131 and 132 are formed at two opposite ends of the piston 13. The section 132 includes an internal face that expands as it extends from the section 131. The section 131 includes, in an external face, an annular groove 1312 for receiving the sealing ring 135. Selectively, the sealing ring 135 is in contact with an internal face of the lining 124 of the seal assembly 12. Thus, the sealing ring 135, which is connected to the section 131 of the piston 13, turns the chamber 114 of the shell 11 into a closed chamber. However, the seal assembly 12 can be omitted and the sealing ring 135 can be in direct contact with the wall of the narrow section 1144 of the chamber 114 of the shell 11 in another embodiment.

The vent 133 extends throughout the piston 13.

Referring to FIGS. 3, 5 and 8, the valve 134 is an elastic element that includes two barbs 1341 formed in the vicinity of a front end, an annular flange 1342 formed in the vicinity of a rear end, a reduced section 1343 extending between the front and rear ends, and a cavity 1344 made in the front end. A diameter of the reduced section 1343 is smaller than a diameter of the annular flange 1342 and a span of the barbs 1341. A length of the reduced section 1343 is larger than a depth of the vent 133.

The barbs 1341 are forced throughout the vent 133 so that the reduced section 1343 of the valve 134 is be inserted in the vent 133. The reduced section 1343 is kept in the vent 133 via the barbs 1341 and the annular flange 1342. The reduced section 1343 of the valve 134 is movable in the vent 133 so that the valve 134 opens or closes the vent 133.

Referring to FIGS. 1 through 3, 5 and 9, each of the stretchable rods 14 includes a stretchable end 141, an abutment end 142, a pivotal portion (not numbered) formed between the stretchable end 141 and the abutment end 142, and two pivots 143 extending from two opposite sides of the portable portion. The pivotal portion of each of the stretchable rods 14 is inserted in a corresponding one of the slits 118 as the pair of pivots 143 is inserted in the recesses 119 of a corresponding pair. The abutment end 142 of each of the stretchable rods 14 is in contact with the internal face of the section 132 of the piston 13. Thus, the internal face of the section 132 of the piston 13 closes or opens the abutment ends 142 of the stretchable rods 14 and hence stretches or withdraws the stretchable ends 141 of the stretchable rods 14 as the piston 13 is moved forward or backward in the chamber 114.

Referring to FIGS. 1, 3, 5 and 9 through 11, the cap 15 is connected to the front edge of the bowl 112 of the shell 11, thereby closing the chamber 114 and limiting the pivoting of the stretchable rods 14 in a proper range. The cap 15 includes a disc-shaped portion 151, slits 152, recesses 153, a cup-shaped portion 154 and a pushing element 155.

The slits 152 are made in the disc-shaped portion 151 of the cap 15. Each of the slits 152 is aligned with a corresponding one of the slits 118 of the shell 11 to allow the pivoting of the stretchable rods 14.

The recesses 153 are made in a rear face of the disc-shaped portion 151 of the cap 15. Each of the recesses 153 is aligned with a corresponding one of the recesses 119 of the shell 11. The pivots 143 are inserted in the recesses 153 and 119 to pivotally connect the stretchable rods 14 to the combination of the cap 15 with the shell 11.

The cup-shaped portion 154 extends from the lower face of the disc-shaped portion 151. Preferably, the cup-shaped portion 154 includes a cavity 1542.

The pushing element 155 is adjustably connected to a rear end of the cup-shaped portion 154. The pushing element 155 is aligned with the valve 134. Preferably, the pushing element 155 is a screw inserted in a screw hole 1544 made in the cup-shaped portion 154 so that a distance of a tip of the pushing element 155 from the rear end of the cup-shaped portion is adjustable.

Figure 12:
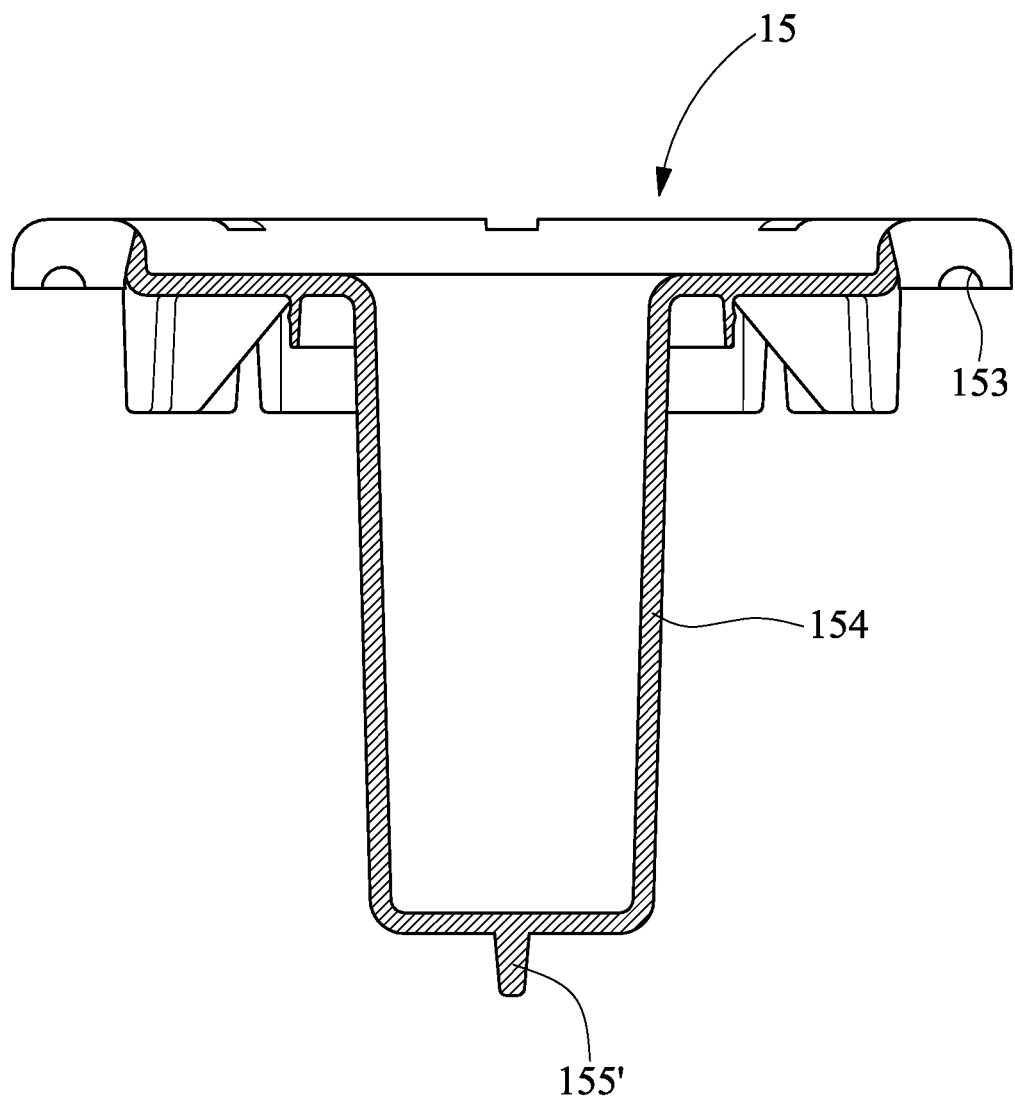
FIG. 12 is a cross-sectional view of a cap of a dust boot tool according to the second embodiment of the present invention.
Figure 13:
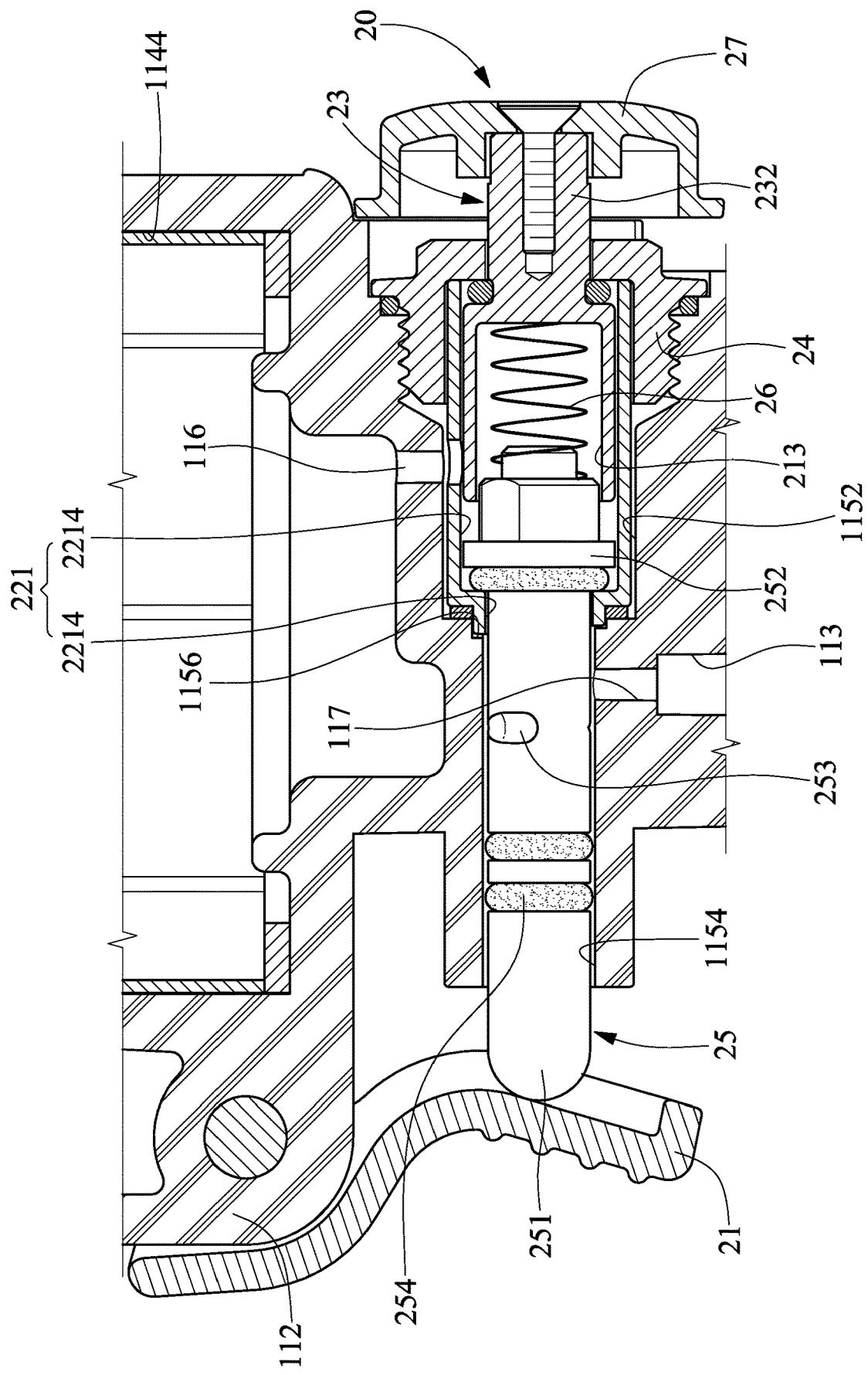
FIG. 13 is an enlarged partial view of the dust boot tool of FIG. 4.
Figure 14:
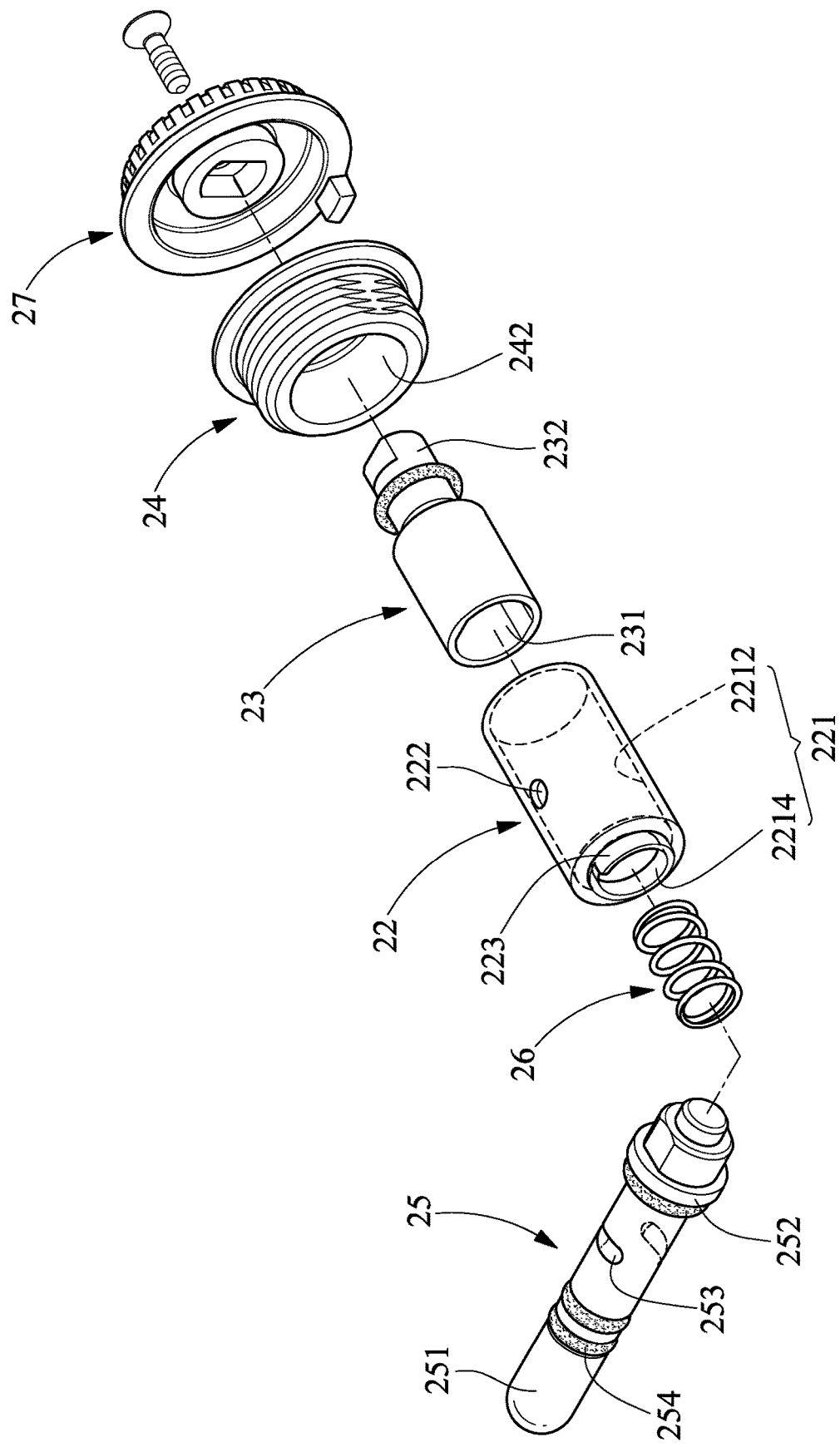
FIG. 14 is an exploded and partial view of the dust boot tool shown in FIG. 13.

Referring to FIG. 12, the pushing element 155' is made in one piece with the cup-shaped portion 154 according to a second embodiment of the present invention.

Figure 9:
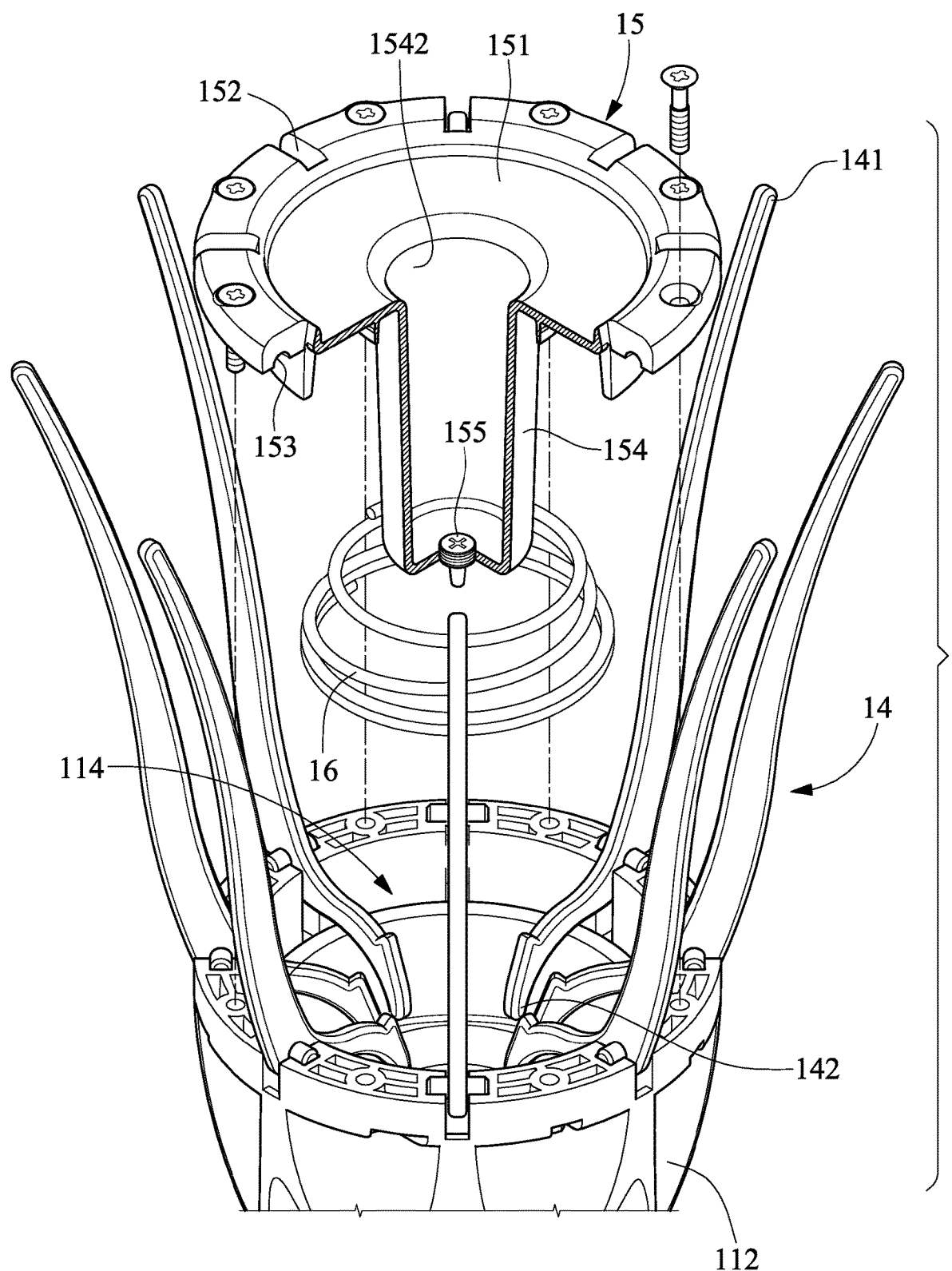
FIG. 9 is enlarged view of another portion of the dust boot tool shown in FIG. 5.
Figure 10:
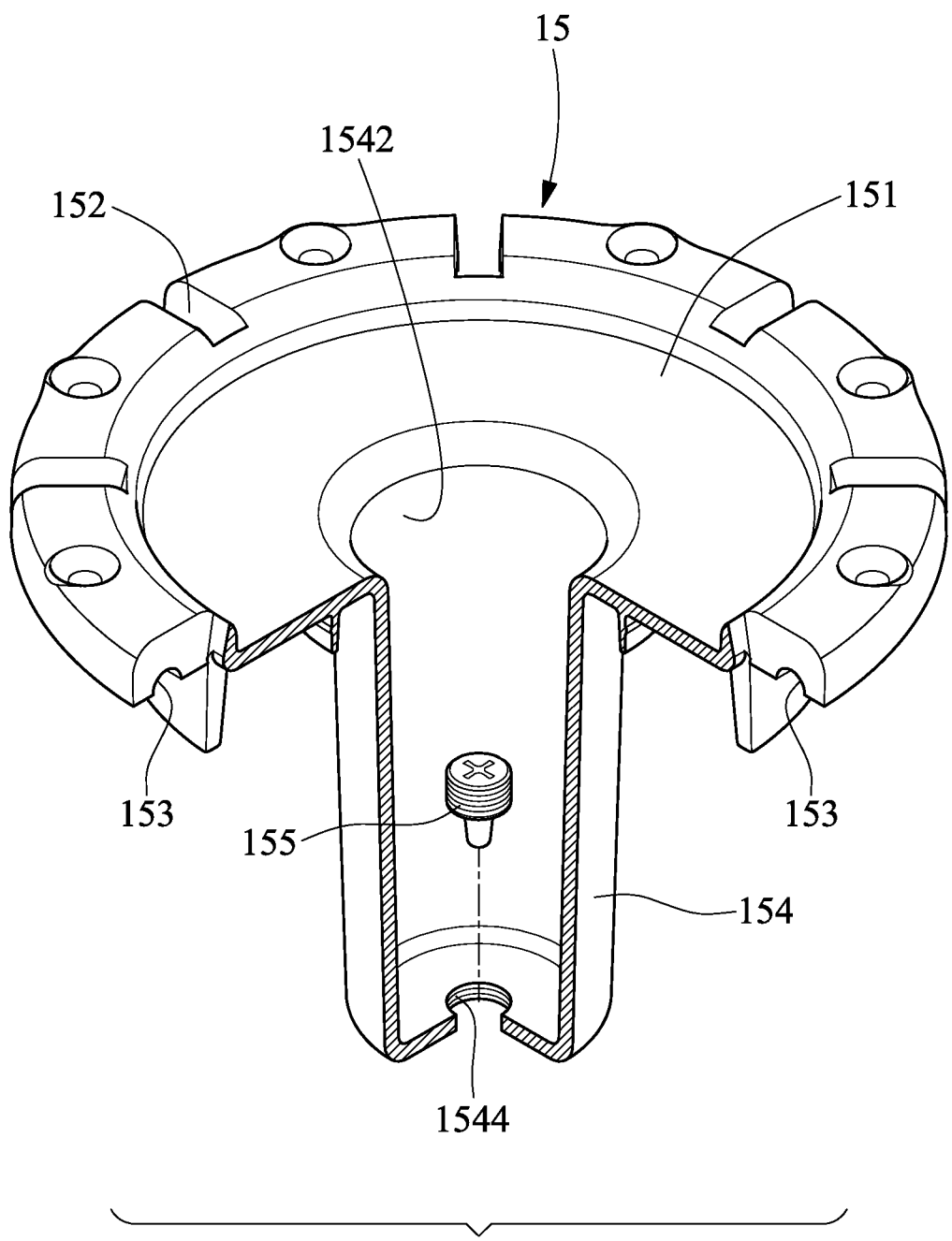
FIG. 10 is an enlarged cut-away view of a cap of the dust boot tool shown in FIG. 5.
Figure 11:
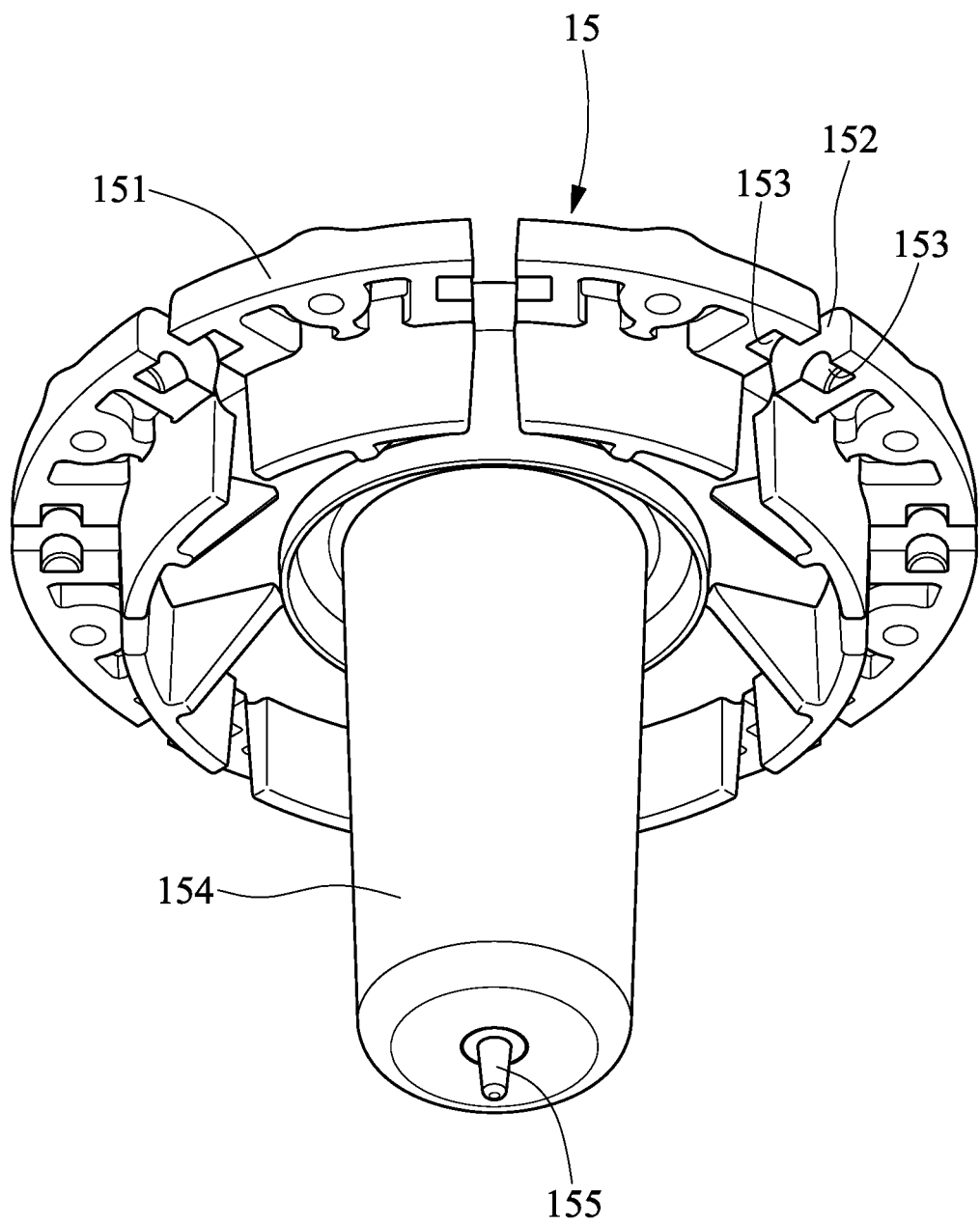
FIG. 11 is a perspective view of the cap shown in FIG. 10.

Referring to FIGS. 3, 5 and 9, the elastic element 16 is preferably a helical spring located around the cup-shaped portion 154. The elastic element 16 includes an upper end in contact with the disc-shaped portion 151 and a lower end in contact with the stretchable rods 14 to open the stretchable ends 141 of the stretchable rods 14.

Referring to FIGS. 1 through 7, 13 and 14, the air controller 20 extends throughout the regulator channel 115 to adjust the flow rate of the pressurized air into the chamber 114 via the inlet channel 113 or completely shut down the pressurized air. The air controller 20 includes a trigger 21, a sleeve 22, a collar 23, a cover 24, a valve rod 25, an elastic element 26 and a knob 27.

The trigger 21 is pivotally connected to an external portion of the bowl 114. The trigger 21 is aligned with the narrow section 1154 of the regulator channel 115.

The sleeve 22 is inserted in the wide section 1152 of the regulator channel 115. The sleeve 22 includes a tunnel 221, an aperture 222 and a positioning extension 223. The tunnel 221 axially extends throughout the sleeve 22, and includes a wide section 2212 and a narrow section 2214. The aperture 222 extends throughout the sleeve 22 in a radial manner, corresponding to the regulator aperture 116. The positioning extension 223 extends from an end of the sleeve 22, corresponding to the transient section 1156 of the regulator channel 115 to facilitate insertion of the sleeve 22 in the regulator channel 115 and communication of the aperture 222 with the regulator aperture 116.

The collar 23 includes a bore 231 made in a first end and an axle 232 formed at a second end. The first end of the collar 23 is inserted in the sleeve 22 so that the collar 23 closes the sleeve 22.

The cover 24 is connected to the handle 111 so that the cover 24 closes the wide section 1152 of the regulator channel 115. The cover 24 includes a central aperture 242. The axle 232 of the collar 23 extends throughout the central aperture 242.

The valve rod 25 includes an external end 251, an internal end (not numbered), an enlarged portion 252, recesses 253 and sealing rings 254. The external end 251 and the internal end of the valve rod 25 are located opposite to each other. The enlarged portion 252 is formed near the internal end of the valve rod 25.

The external end 251 extends out of the handle 111 through the narrow section 2214 of the regulator channel 221 and abutted against the trigger 21. The enlarged portion 252 is inserted in the wide section 2212 of the tunnel 221 of the sleeve 22. The internal end of the valve rod 25 is inserted in the bore 231 of the collar 23. Thus, the valve rod 25 is movable together with the collar 23.

The recesses 253 are located between the external end 251 and internal end of the valve rod 25. The recesses 253 are arranged evenly around the valve rod 25. The recesses 253 are selectively aligned with the regulator aperture 117 when the external end 251 is pushed by the trigger 21. The recesses 253 differ from one another regarding width and depth.

The sealing rings 254 are located around the valve rod 25. The sealing rings 254 are located between the external end 251 and the internal end of the valve rod 25.

The elastic element 26 is preferably a helical spring inserted in the bore 231 of the collar 23. The elastic element 26 includes an end in contact with the enlarged portion 252 of the valve rod 25 and a closed end of the bore 231. Thus, the recesses 253 of the valve rod 25 are normally biased from or not aligned with the regulator aperture 117.

The knob 27 is provided around the axle 232 of the collar 23. That is, the axle 232 of the collar 23 fitted in the knob 27. The knob 27 is operable to rotate the collar 23.

As discussed above, the dust boot tool according to the present invention is made. The use of the dust boot tool will be described.

Referring to FIGS. 1 through 6, a dust boot (not shown) is provided around the stretchable ends 141 of the stretchable rods 14. The handle 111 is connected to an air supply such as a pump (not shown) so that pressurized air can be introduced into the inlet channel 113 of the shell 11 from the air supply.

Normally, the valve rod 25 of the air controller 20 is pushed by the elastic element 26 so that the recesses 253 of the valve rod 25 are biased from the regulator aperture 117 (the inlet channel 113) of the shell 11. Now, the pressurized cannot enter the chamber 114 from the inlet channel 113.

Figure 15:
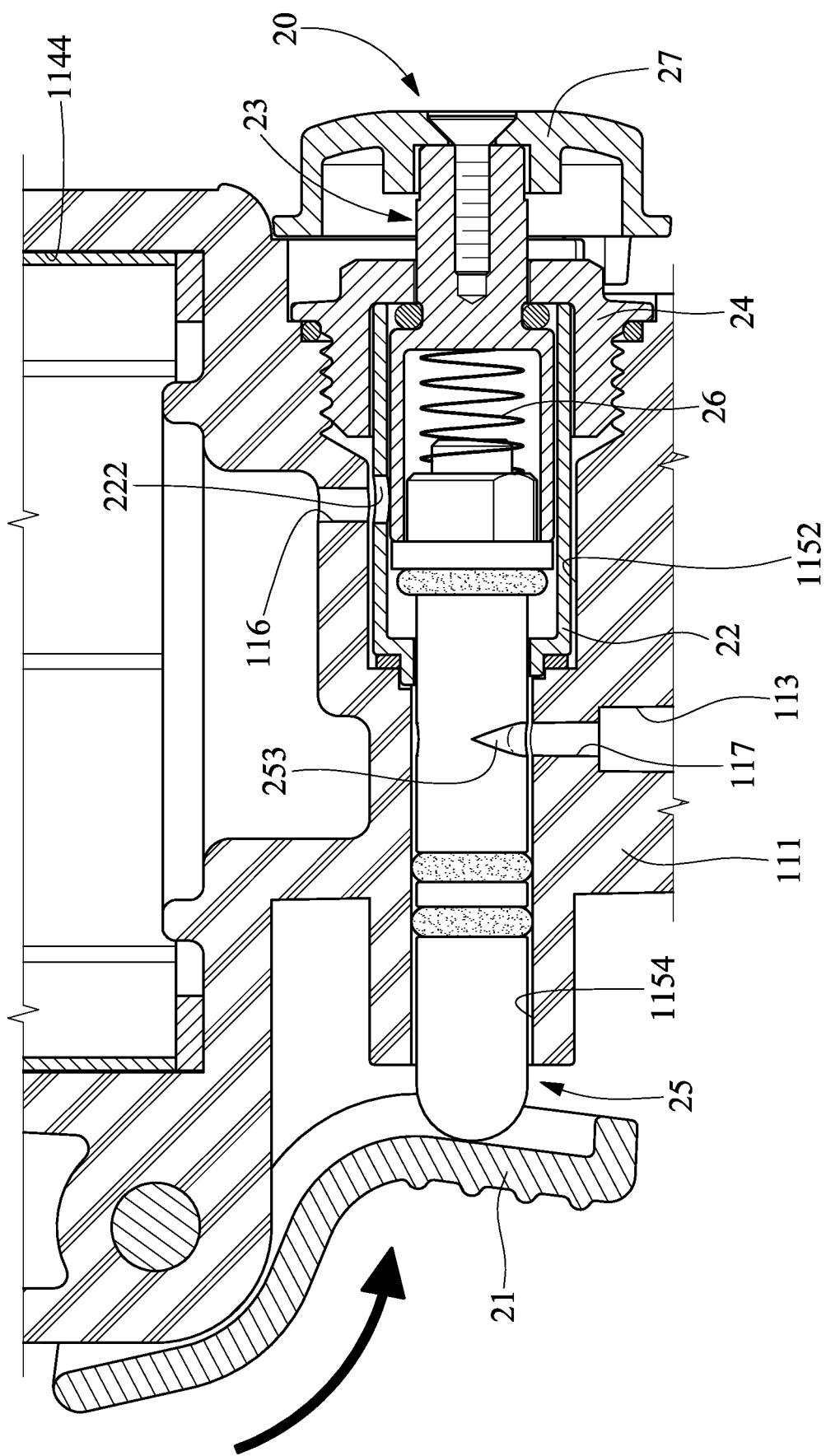
FIG. 15 is an enlarged partial view of the dust boot tool in another position than shown in FIG. 13.
Figure 16:
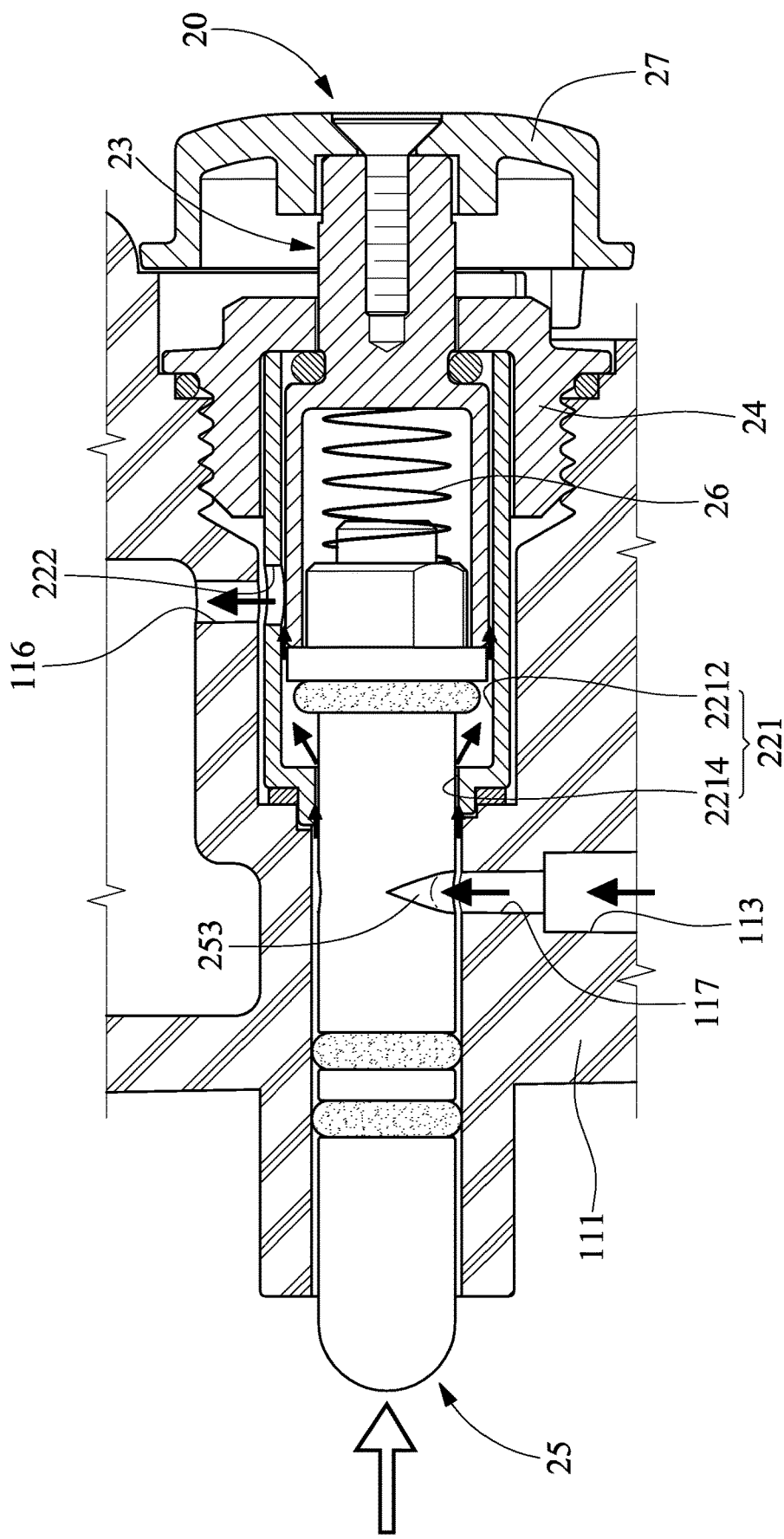
FIG. 16 is an enlarged partial view of the dust boot tool of FIG. 15.
Figure 17:
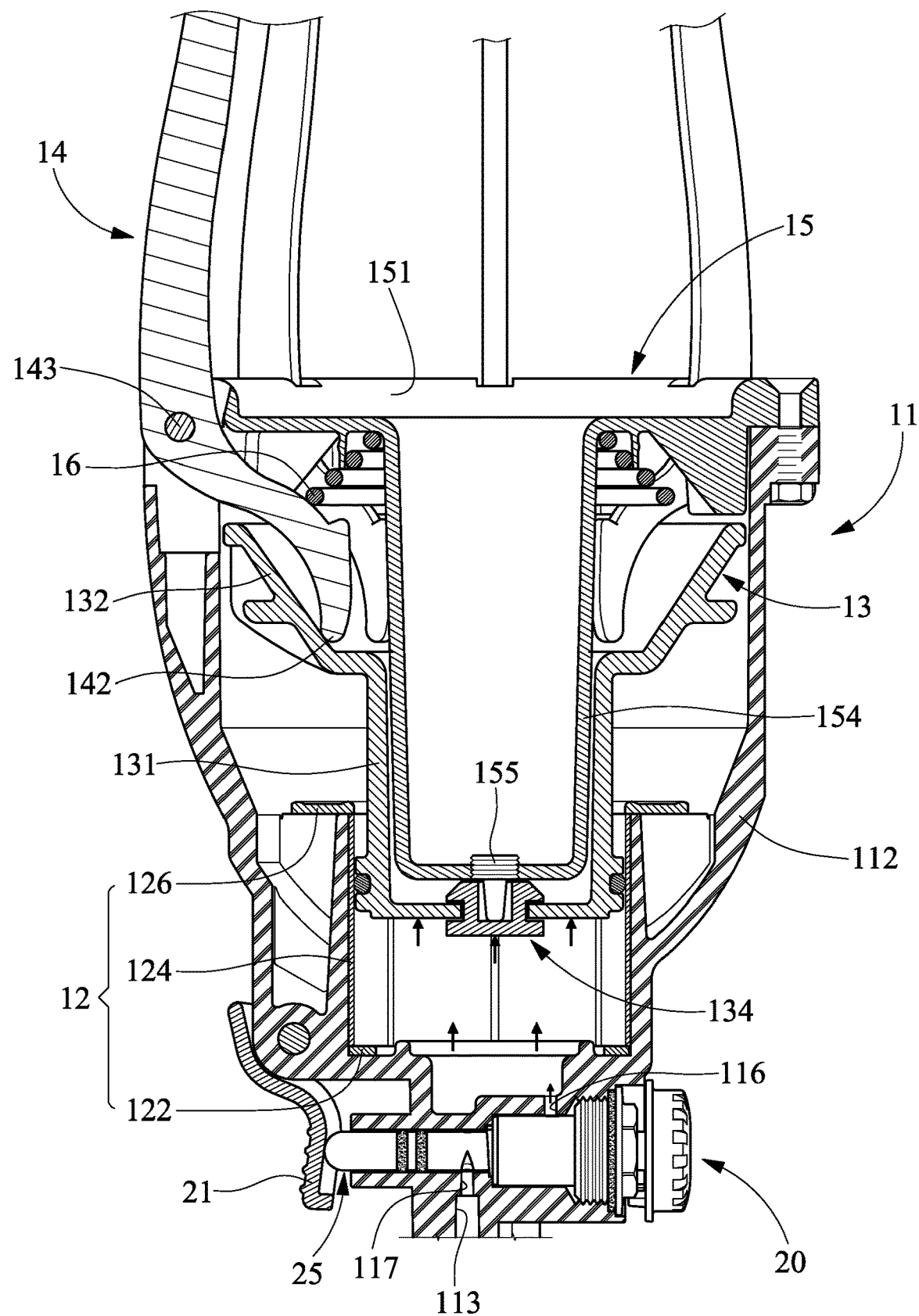
FIG. 17 is a cross-sectional view of the dust boot tool in another position than shown in FIG. 3.

Referring to FIGS. 15 through 17, a user can pull the trigger 21 to push the valve rod 25 by the rounded end 251 to compress the elastic element 26. Thus, a selected one of the valve recesses 253 of the rod 25 is aligned with the regulator aperture 117 of the shell 11.

The pressurized air goes into the tunnel 221 of the sleeve 22 from the regulator aperture 117 via the selected recess 253 and the gap between the valve rod 25 and the wall of the regulator channel 115. The pressurized air further goes into the chamber 114 via the aperture 222 and the regulator aperture 116, thereby pushing the piston 13 forward (or upward as shown). Now, the valve 134 is also pushed forward by the pressurized air so that the annular flange 1342 is abutted against the rear end of the piston 13 and the vent 133 is shut.

During the movement of the piston 13, the internal face of the section 132 of the piston pushes the abutment ends 142 of the stretchable rods 14. Accordingly, the stretchable rods 14 pivot about the pivots 143. Hence, the stretchable ends 141 of the stretchable rods 14 open or stretch to expand the dust boot.

Figure 18:
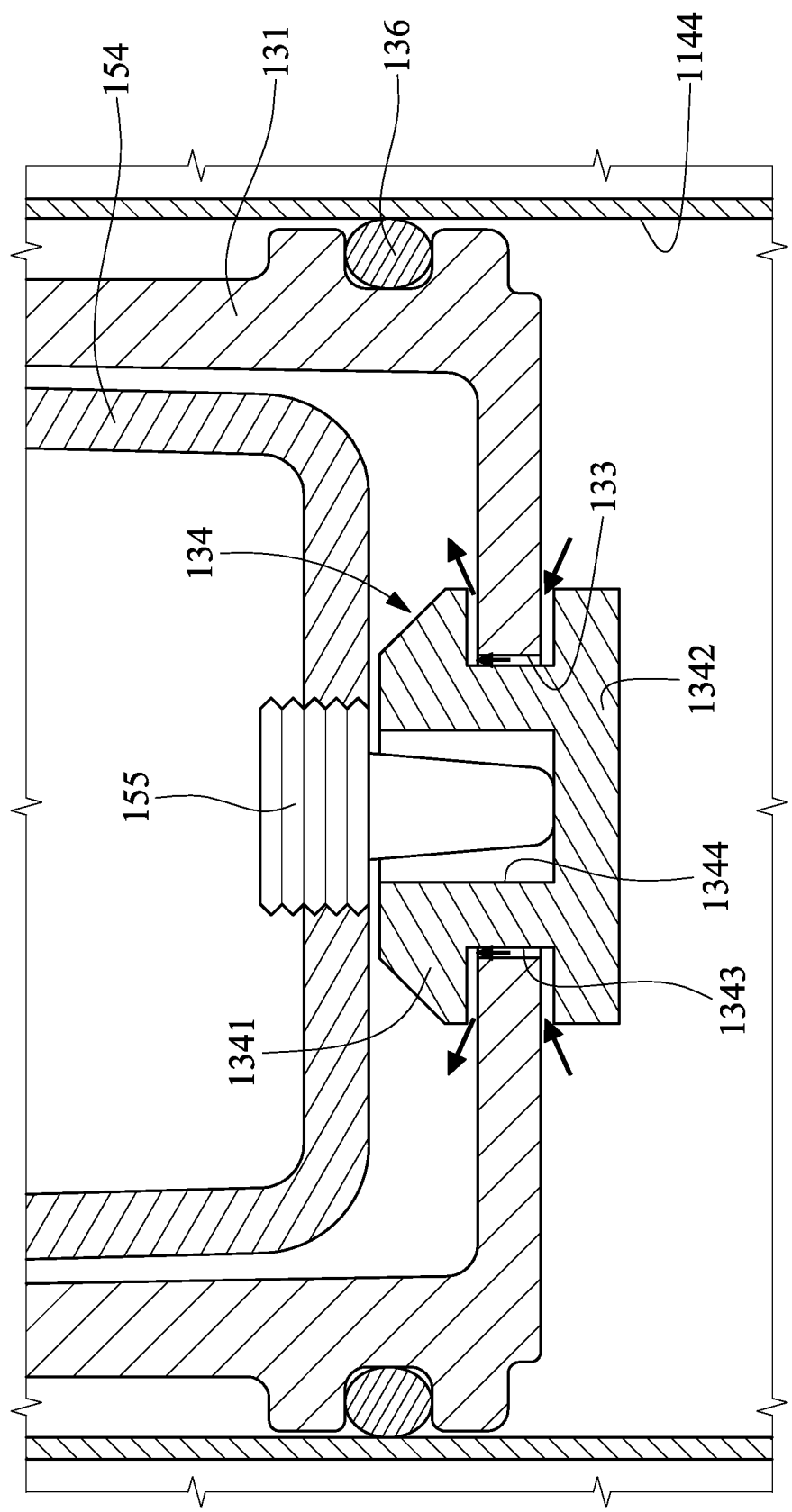
FIG. 18 is an enlarged partial view of the dust boot tool of FIG. 17.
Figure 20:
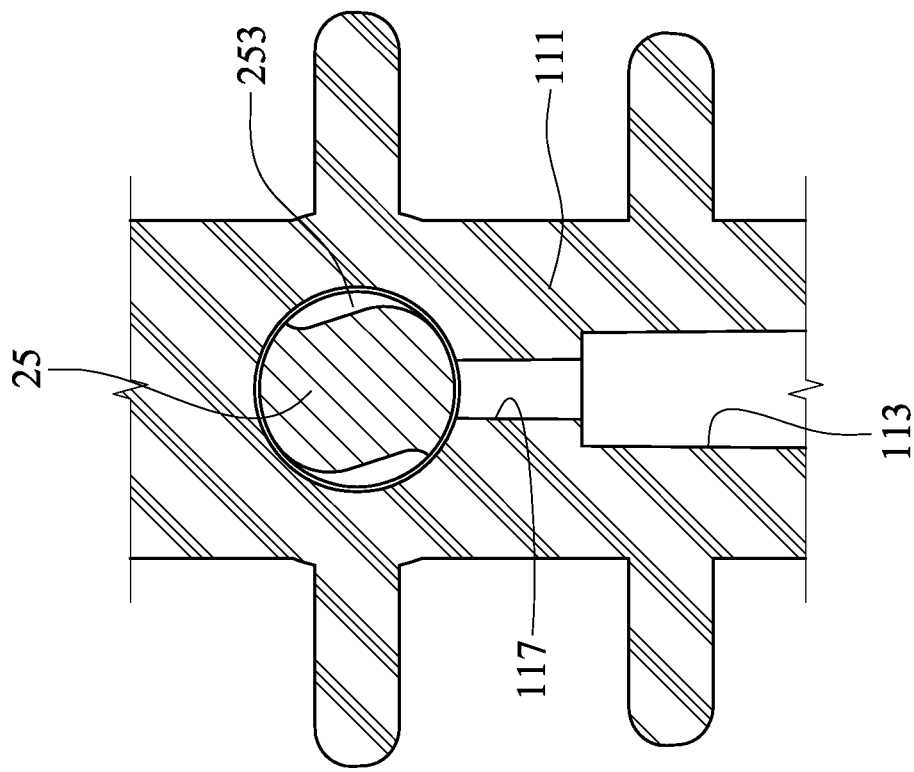
FIG. 20 is a cross-sectional view of the dust boot tool in another position than shown in FIG. 19.
Figure 19:
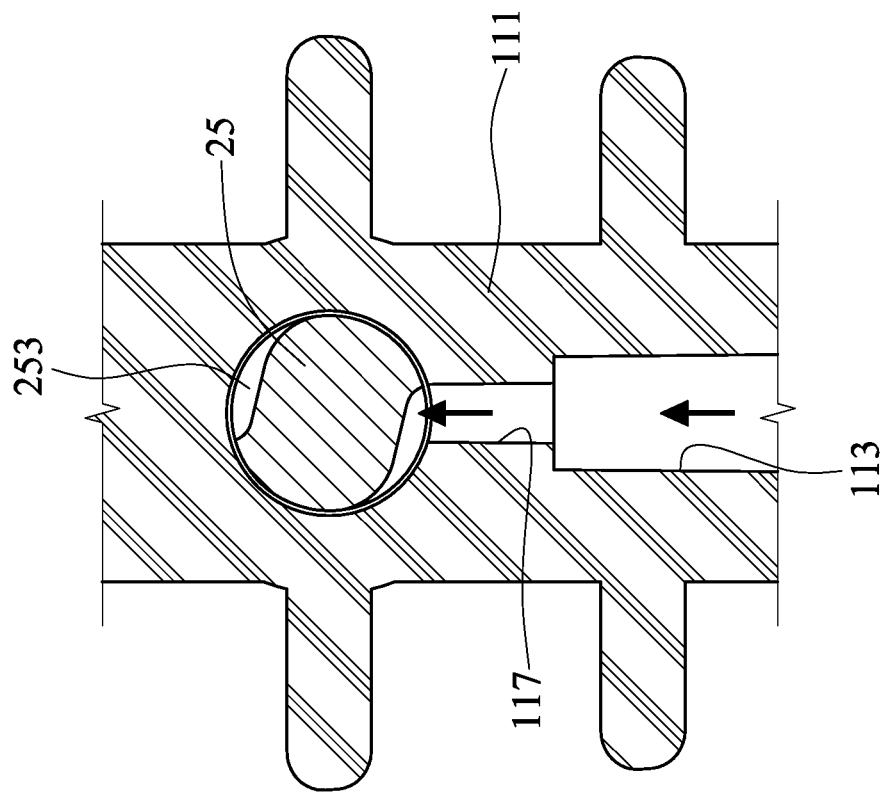
FIG. 19 is a cross-sectional view of the dust boot tool of FIG. 13.

Referring to FIGS. 17 and 18, to avoid over-stretching of the stretchable rods 14, the pushing element 155, which extends from the rear end of the cap 15, pushes the valve 134 when the piston 13 is moved forward by the pressurized air to a predetermined extent. Thus, the pressurized air is admitted into the section 131 of the piston 13 via the vent 133. That is, the pressurized air is vented. Hence, over-stretching of the stretchable rods 14 is avoided.

Referring to FIGS. 13, 14, 19 and 20, to facilitate the control of the pressurized air into the chamber 114, the user can operate the knob 27 to rotate the collar 23 and the valve rod 25. Thus, another recess 253 with a different width and depth can be aligned with the regulator aperture 117. That is, the flow rate of the pressurized is adjusted.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A dust boot tool comprising:
a shell comprising an inlet channel and a chamber in communication with the inlet channel, wherein pressurized air enters the chamber via the inlet channel;
a piston movable in the chamber by the pressurized air and comprising a first section, a second section opposite to the first section, a vent in the first section in the vicinity of the inlet channel, and a conical internal face extending on the second section;
a valve comprising a portion movably inserted in the vent; and
stretchable rods each of which comprises a stretchable end for contact with a dust boot, an abutment end in contact with the conical internal face of the second section of the piston, and a pivotal portion formed between the stretchable end and the abutment end and pivotally connected to the shell.

2. The dust boot tool according to claim 1, wherein the shell comprises pairs of recesses evenly arranged around the chamber and slits each of which is located between the recesses of a corresponding pair, and each of the stretchable rods further comprises a pair of pivots formed on the pivotal portion and inserted in a corresponding pair of recesses while the pivotal portion is inserted in a corresponding one of the slits.

3. The dust boot tool according to claim 2, further comprising a cap connected to the shell to keep the pairs of pivots in the pairs of recesses.

4. The dust boot tool according to claim 3, wherein the cap comprises slits for receiving the pivotal portions of the stretchable rods and pairs of recesses for receiving the pairs of pivots of the stretchable rods.

5. The dust boot tool according to claim 3, wherein the cap comprises a disc-shaped portion connected to the shell and a cup-shaped portion in contact with the valve.

6. The dust boot tool according to claim 5, wherein the cap comprises a pushing element extending from the cap to abut against the valve.

7. The dust boot tool according to claim 5, further comprising a first elastic element compressed between the disc-shaped portion of the cap and the stretchable rods so that the stretchable rods are normally withdrawn by opening and closing.

8. The dust boot tool according to claim 1, further comprising a sealing ring located around the piston and in contact with a wall of the chamber.

9. The dust boot tool according to claim 8, wherein the piston comprises an annular groove for receiving the sealing ring.

10. The dust boot tool according to claim 1, further comprising:
   a first sealing ring inserted in the chamber;
   a lining located on the first sealing ring; and
   a retaining ring located on the lining and connected to the shell.

11. The dust boot tool according to claim 10, further comprising a second sealing ring located around the piston and in contact with an internal face of the lining.

12. The dust boot tool according to claim 11, wherein the piston further comprises an annular groove for receiving the second sealing ring.

13. The dust boot tool according to claim 1, wherein the shell further comprises:
   a regulator channel for receiving an air controller for connecting the inlet channel to the chamber or disconnecting the inlet channel from the chamber;
   a first regulator aperture in communication with the regulator channel and the chamber; and
   a second regulator aperture in communication with the regulator channel and the inlet channel.

14. The dust boot tool according to claim 13, wherein the air controller comprises:
   a trigger pivotally connected to the shell corresponding to an end of the regulator channel;
   a sleeve comprising a tunnel and an aperture for connecting the tunnel to the first regulator aperture;
   a collar comprising a bore made in an end and an axle formed at an opposite end, wherein the bore is located in the tunnel;
   a cover connected to the shell to close an opposite end of the regulator channel and comprises a central aperture through which the axle extends; and
   a valve rod comprising:
      an internal end inserted in the regulator channel and fitted in the bore of the collar;
      an external end extending into contact with the trigger from the regulator channel;
      an enlarged portion formed in the vicinity of the internal end of the valve rod;
      at least one recess aligned with the second aligned with the second regulator aperture when the valve rod is in a selected position;
      at least one sealing ring located around the valve rod in the vicinity of the external end; and
      a second elastic element inserted in the bore and compressed between the enlarged portion and the collar to normally bias the recess from the second regulator aperture.

15. The dust boot tool according to claim 14, wherein the air controller further comprises a knob connected to the axle.

\* \* \* \* \*